United States Patent
Schmalenberg et al.

(10) Patent No.: US 12,543,964 B2
(45) Date of Patent: Feb. 10, 2026

(54) VEHICLE HEART RATE DETECTION DEVICE, RESONATORS, AND METHODS OF DETECTING A HEART RATE

(71) Applicant: Toyota Motor Engineering & Manufacturing North America, Inc., Plano, TX (US)

(72) Inventors: Paul D. Schmalenberg, Ann Arbor, MI (US); Frederico Marcolino Quintao Severgnini, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 417 days.

(21) Appl. No.: 18/186,496

(22) Filed: Mar. 20, 2023

(65) Prior Publication Data
US 2024/0315585 A1   Sep. 26, 2024

(51) Int. Cl.
*A61B 5/024* (2006.01)
*A61B 5/00* (2006.01)

(52) U.S. Cl.
CPC ........ *A61B 5/02444* (2013.01); *A61B 5/6893* (2013.01); *A61B 2562/0204* (2013.01)

(58) Field of Classification Search
CPC .............. A61B 5/02444; A61B 5/6893; A61B 2562/0204; A61B 5/024
See application file for complete search history.

(56) References Cited

U.S. PATENT DOCUMENTS

| | | | | |
|---|---|---|---|---|
| 3,600,515 A | * | 8/1971 | Carpenter | G10L 21/00 381/54 |
| 5,210,718 A | * | 5/1993 | Bjelland | G01V 13/00 367/13 |
| 5,783,780 A | * | 7/1998 | Watanabe | F02M 35/1261 181/252 |
| 5,853,005 A | * | 12/1998 | Scanlon | A61B 5/6896 381/166 |
| 6,109,304 A | * | 8/2000 | Wolf | F16L 55/054 220/721 |
| 2003/0229289 A1 | * | 12/2003 | Mohler | A61B 5/318 600/508 |
| 2004/0140737 A1 | * | 7/2004 | Barillot | H02N 2/028 310/328 |

FOREIGN PATENT DOCUMENTS

KR    101637830 B1 *   7/2016   .............. A61B 7/04

* cited by examiner

*Primary Examiner* — Christian Jang
(74) *Attorney, Agent, or Firm* — DINSMORE & SHOHL LLP

(57) ABSTRACT

A resonator for a vehicle heart rate detection device is disclosed. The resonator includes a chamber having a front wall and a sidewall extending circumferentially around the front wall, and the sidewall defines a rear opening opposite the front wall. A lid is secured over the rear opening, and the lid, the front wall, and the sidewall define a cavity within an interior of the chamber. A neck extends from the front wall of the resonator and defines a front opening, and a microphone is positioned within the cavity that records vibrations entering the cavity via the front opening. The cavity is filled at least partially with a first material and at least partially with a second material, and the cavity amplifies the vibrations within a target range frequency.

20 Claims, 8 Drawing Sheets

VEHICLE HEART RATE DETECTION DEVICE, RESONATORS, AND METHODS OF DETECTING A HEART RATE

TECHNICAL FIELD

The present specification generally relates to vehicle heart rate detection devices, and more specifically, resonators for vehicle heart rate detection devices and methods of detecting a heart rate.

BACKGROUND

Heart rate monitoring is commonly used to track an individual's health and well-being, particularly in individuals with pre-existing conditions. The health and well-being of an individual may be especially significant in high-risk situations, such as when the individual is operating a vehicle. Current heart rate monitors may utilize electrical methodologies, which implement electrocardiogramsors to measure the bio-potential generated by electrical signals that control the expansion and contraction of heart chambers. Conversely, optical methodologies may be utilized which implement optical sensors to measure heart rate by shining a light from a light source through the skin and measuring how it scatters off blood vessels. However, both electrical and optical methodologies require that a person's skin be in direct contact with an appropriate sensor to perform heart rate measurements. Contact with the clothing of a person will not result in an accurate heart rate measurement.

Microphones have also been utilized to measure a person's heart rate by detecting sounds generated by the pumping action of the heart. Although this type of methodology does not require direct contact with the skin, accurate measurements are difficult to achieve because the sound generated by the heart is very faint. Moreover, the signal-to-noise ratio is extremely unfavorable, leading to measurement difficulties.

Accordingly, a need exists for a heart rate monitoring device that can monitor the heart rate of an individual within a vehicle in order to ensure that the individual does not experience a medical situation while operating the vehicle.

SUMMARY

In one embodiment, a resonator for a heart rate detection device is disclosed. The resonator includes a chamber having a front wall and a sidewall extending circumferentially around the front wall, and the sidewall defines a rear opening opposite the front wall. A lid is secured over the rear opening, and the lid, the front wall, and the sidewall define a cavity within an interior of the chamber. A neck extends from the front wall of the resonator and defines a front opening, and a microphone is positioned within the cavity that records vibrations entering the cavity via the front opening. The cavity is filled at least partially with a first material and at least partially with a second material, and the cavity amplifies the vibrations within a target range frequency.

In another embodiment, a vehicle heart rate detection device is disclosed. The vehicle heart rate detection device includes a seat having a seatback, and a resonator embedded in the seatback. The resonator may further include a chamber having a front wall and a sidewall extending circumferentially around the front wall, and the sidewall defines a rear opening opposite the front wall. A lid is secured over the rear opening, and the lid, the front wall, and the sidewall define a cavity within an interior of the chamber. A neck extends from the front wall of the resonator and defines a front opening, and a microphone is positioned within the cavity that records vibrations entering the cavity via the front opening. The vehicle heart rate detection device may further include a processor electrically coupled to the resonator that generates a heart rate data of a vehicle occupant based on the vibrations entering the cavity of the resonator. A display may be electrically coupled to the processor, and may provide visual feedback related to the heart rate data generated by the processor. A speaker may also be electrically coupled to the processor, and may provide aural feedback related to the heart rate data generated by the processor. The vehicle heart rate detection device may also include a memory that stores the heart rate data generated by the processor to create a user profile for the vehicle occupant. In these embodiments, the cavity of the resonator is filled at least partially with a first material and at least partially with a second material such that the cavity amplifies vibrations within a target range frequency.

In yet another embodiment, a method of detecting a heart rate of a vehicle occupant is disclosed. The method may involve embedding a heart rate detection device including a resonator into a seatback of a vehicle and automatically initiating the heart rate detection device when the vehicle occupant engages the seatback of the vehicle. Once the heart rate detection device is initiated, the method may involve establishing a baseline heart rate of the vehicle occupant using the resonator, and monitoring, in real-time, the heart rate of the vehicle occupant to determine deviations in the heart rate of the vehicle occupant from the baseline heart rate. The method may finally involve providing visual and/or aural feedback to the vehicle occupant that represents data associated with the heart rate of the vehicle occupant.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
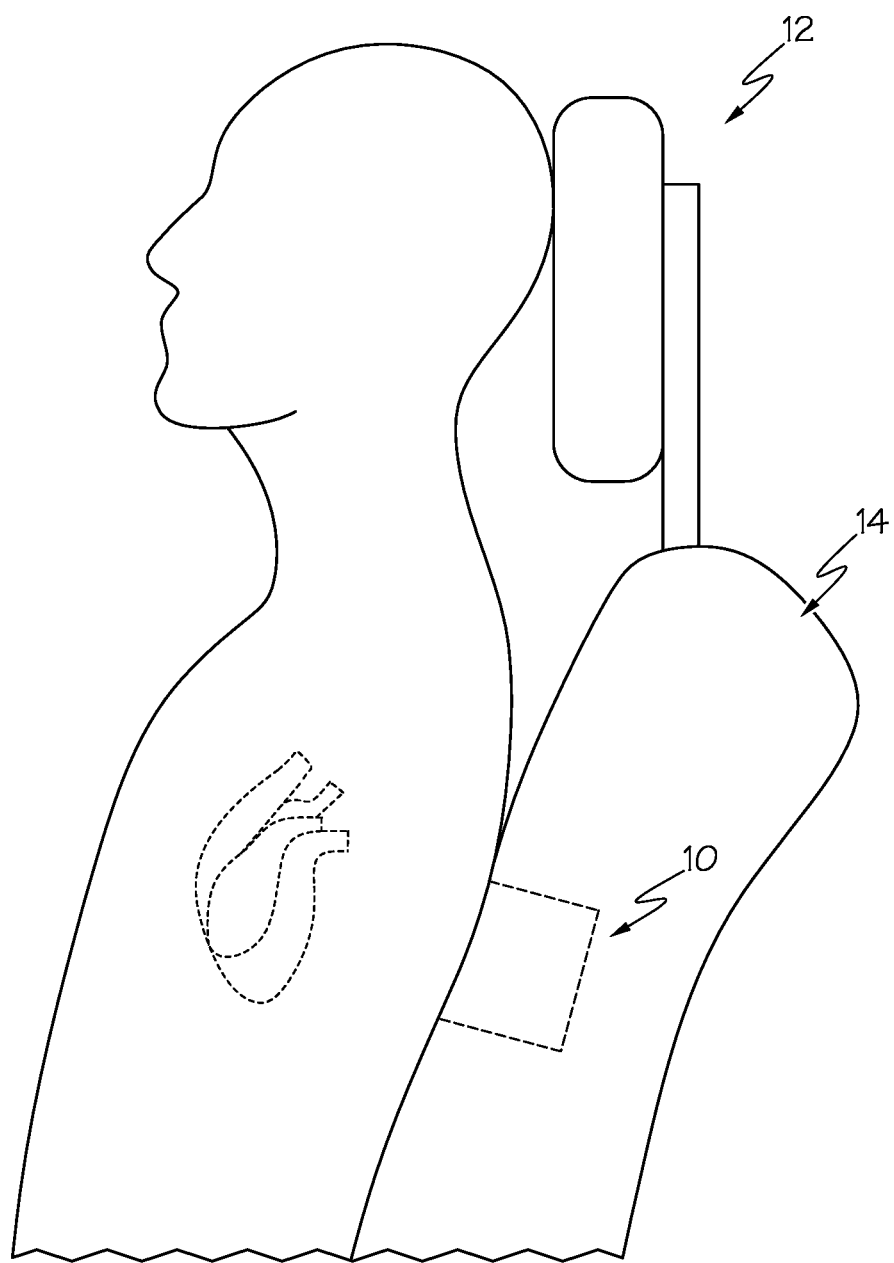
FIG. 1 a perspective view of a heart rate monitoring device positioned within a vehicle, according to one or more embodiments shown and described herein.

Embodiments described herein are generally directed to vehicle heart rate detection devices, resonators, and methods of detecting a heart rate of a vehicle occupant. As described herein, a resonator for a vehicle heart rate detection device may include a chamber having a front wall and a sidewall extending circumferentially around the front wall, and the sidewall defines a rear opening opposite the front wall. A lid is secured over the rear opening, and the lid, the front wall, and the sidewall define a cavity within an interior of the chamber. A neck extends from the front wall of the resonator and defines a front opening, and a microphone is positioned within the cavity that records vibrations entering the cavity via the front opening. The cavity is filled at least partially with a first material and at least partially with a second material, and the cavity amplifies the vibrations within a target range frequency.

In these embodiments, the resonator may be embedded in a seatback of a seat of the vehicle, such that the microphone of the resonator is positioned near a chest of the vehicle occupant. By positioning the resonator in this manner, the microphone may be adjacent the heart of the vehicle occupant, such that the microphone is able to detect the heart rate of the vehicle occupant when the vibrations generated by the heart rate of the vehicle occupant are amplified by the resonator.

The resonator and heart rate detection device described herein may provide a convenient and effective way to monitor heart health of the vehicle occupant while driving or riding in the vehicle. The device may also help drivers and passengers stay alert and focused on the road, and can alert them if they are experiencing stress or fatigue that may affect their driving ability. In some embodiments, the device may also provide valuable data on heart health over time, allowing drivers and passengers to track and manage their heart health more effectively.

Various embodiments of vehicle heart rate detection devices, resonators, and methods of operating autonomous vehicles will now be described herein. Whenever possible, the same reference numerals will be used throughout the drawings to refer to the same or like parts.

Referring now to FIG. 1, a vehicle heart rate detection device 10 is depicted within a vehicle. In these embodiments, the heart rate detection device 10 may be positioned and/or embedded within a seat 12 of the vehicle, such that the heart rate detection device 10 may measure the heart rate of a vehicle occupant that has engaged (e.g., sits) in the seat 12. More particularly, the heart rate detection device 10 may be positioned and/or embedded within a seat back 14 of the vehicle, such that the heart rate detection device 10 is positioned near the chest of an occupant of the vehicle. As will be described in additional detail herein, the sounds generated by the heart may be very faint, which may result in unfavorable signal-to-noise ratios and difficulties measuring heart rate. Accordingly, by positioning the heart rate detection device 10 near the chest of the occupant of the vehicle, the heart rate detection device 10 may more easily obtain heart rate measurements.

Although the heart rate detection device 10 is depicted as being integrated into the seat 12 of the vehicle, it should be understood that the heart rate detection device 10 may be integrated into any component of the vehicle that allows the heart rate detection device 10 to measure the heart rate of a vehicle occupant. For example, the heart rate detection device 10 may similarly be embedded in a seat cushion of the seat 12 of the vehicle.

Figure 2:
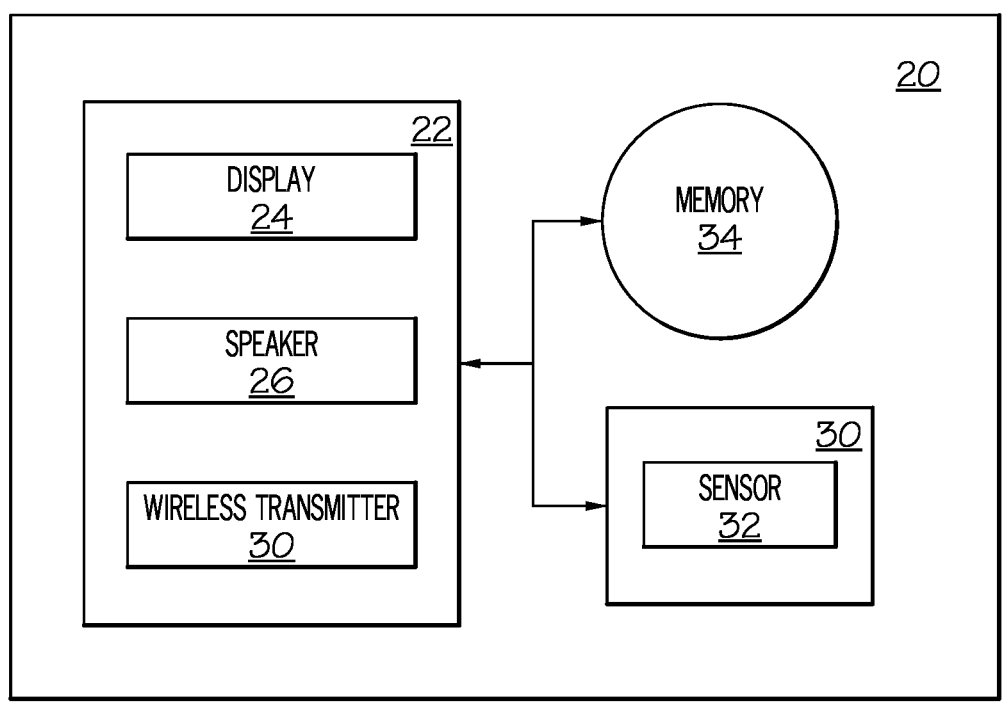
FIG. 2 schematically depicts an operating system of the heart rate monitoring device of FIG. 1, according to one or more embodiments shown and described herein.

Turning now to FIG. 2, a schematic of an operating system 20 of the heart rate detection device 10 is depicted. In these embodiments, it should be understood that the operating system 20 of the heart rate detection device 10 may allow the heart rate detection device to collect critical heart rate data, including heart rate and heart rate variability, and other physiological data related to the occupant of the user, process the data in real-time, and provide visual and/or aural feedback to the occupant based on the heart rate data. Furthermore, the operating system 20 may compile heart rate data of the occupant of the vehicle over an extended period of time, such that the heart rate detection device 10 may be capable of identifying long term irregularities and/or variability in the heart rate of the vehicle occupant.

In some embodiments, the operating system 20 may be further configured to provide warnings to the occupant of the vehicle when the measured heart rate exceeds a predetermined threshold. For example, an accelerated heart rate may indicate that the occupant of the vehicle is experiencing stress and/or fatigue. In these embodiments, the operating system 20 may convey a warning to the occupant of the vehicle, which may suggest that the occupant pull over and/or take a break for driving. Additionally, in some embodiments, the operating system 20 may be further configured to autonomously adjust operation of the vehicle in response to certain heart rate measurements, as will be described in additional detail herein.

Referring still to FIG. 2, the example operating system 20 may have a processor 22 for controlling overall operation of the heart rate detection device 10 and its associated components, which may include a display 24, a speaker 26, a wireless transmitter 28, an input component 30, such as a sensor 32, and memory 34, as will be described in additional detail herein. Although the operating system 20 may include each of the components described herein, it should be understood that the operating system 20 may include only some of the foregoing components. For example, in some embodiments, the operating system 20 may not include the speaker 26 or wireless transmitter 28. Furthermore, in some embodiments, the display 24 and speaker 26 may be vehicle components that integrate with the operating system 20.

Furthermore, it should be noted that the heart rate detection device 10 may be powered by a battery or by the vehicle's electrical system. In embodiments in which the heart rate detection device 10 is powered by a battery, the heart rate detection device 10 may also include a charging port or a wireless charging system to allow the battery to be recharged if necessary.

In these embodiments, the input component 30 may include at least one data collection device which may obtain heart rate data related to the occupant of the vehicle. For example, the input component 30 may be a sensor 32 that may be configured to measure the heart rate of the occupant of the vehicle. The input component 30 may be described in additional detail herein in reference to FIGS. 3-7.

Referring still to FIG. 2, the input component 30 may be connected to the processor 22 via hardware connections, such as USB, serial cables, parallel cables, etc. The input component may also be connected via wireless connections, such as Bluetooth, cellular technology, or other similar technologies. As the input component 30 measures heart rate data of the vehicle occupant, the heart rate data may be stored in memory 34. In these embodiments, the processor 22 and its associated components may allow the operating system 20 to generate a heart rate summary for the occupant of the vehicle and analyze the heart rate data of the occupant of the vehicle during a drive. As has been described herein, the processor 22 may further allow the operating system 20 to adjust at least one of a plurality of vehicle operations in response to the heart rate data obtained by the input component 30.

As further depicted in FIG. 2, each of the display 24, speaker 26, wireless transmitter 28, and input component 30 may be electrically coupled to the processor 22, such that the processor 22 is able to control operation of the heart rate detection device 10. In these embodiments, the processor 22 may analyze the heart rate data obtained by the input component 30 to determine the heart rate and/or heart rate variability of the occupant of the vehicle. It should be understood that the input component 30 may measure heart rate data of the occupant of the vehicle in real-time throughout the course of a drive, which may allow the processor 22 to similarly analyze the heart rate data measured by the input component 30 in real-time.

In these embodiments, the processor 22 may utilize the display 24 to provide visual information to the occupant of the vehicle related to the heart rate of the occupant. For example, the display 24 may display the current heart rate of the occupant of the vehicle, a resting heart rate of the occupant of the vehicle, a plot of the heart rate of the occupant throughout the course of the drive, or any similar visual indicator that conveys heart rate data obtained by the input component 30 to the occupant. In some embodiments, the display 24 may further include a plurality of inputs, such as a touch screen or other input buttons, which may allow the occupant of the vehicle to input information about their age, gender, and other relevant health data to the processor 22. This information may be used to more accurately analyze heart rate data, such as heart rate variability, which may allow the processor 22 to provide more personalized feedback.

Similarly, the processor 22 may utilize the speaker 26 to provide audio feedback to the occupant of the vehicle related to the heart rate of the occupant. For example, the speaker 26 may be configured to provide a series of warnings or audio messages to the occupant of the vehicle that reflect the heart rate data measured by the input component 30. In these embodiments, the speaker 26 may be integrated into the display 24, such that the heart rate detection device 10 is capable of simultaneously providing visual and aural feedback to the occupant of the vehicle. Furthermore, the processor 22 may further utilize the wireless transmitter 28 to transmit the heart rate data measured by the input component to a remote device, such as a smartphone or smartwatch. It should be understood that the processor 22 may further be configured to provide simultaneous visual and aural feedback to the occupant of the vehicle while also relaying the heart rate data to the remote device.

Although the embodiments shown and described herein depict a single heart rate detection device 10, it should be further understood that any number of heart rate detection devices 10 may be implemented in a vehicle. For example heart rate detection devices 10 may be positioned in both a driver seat of the vehicle and a passenger seat of the vehicle, such that the heart rate detection devices 10 may measure and monitor the heart rate of multiple occupants in the vehicle.

Figure 3:
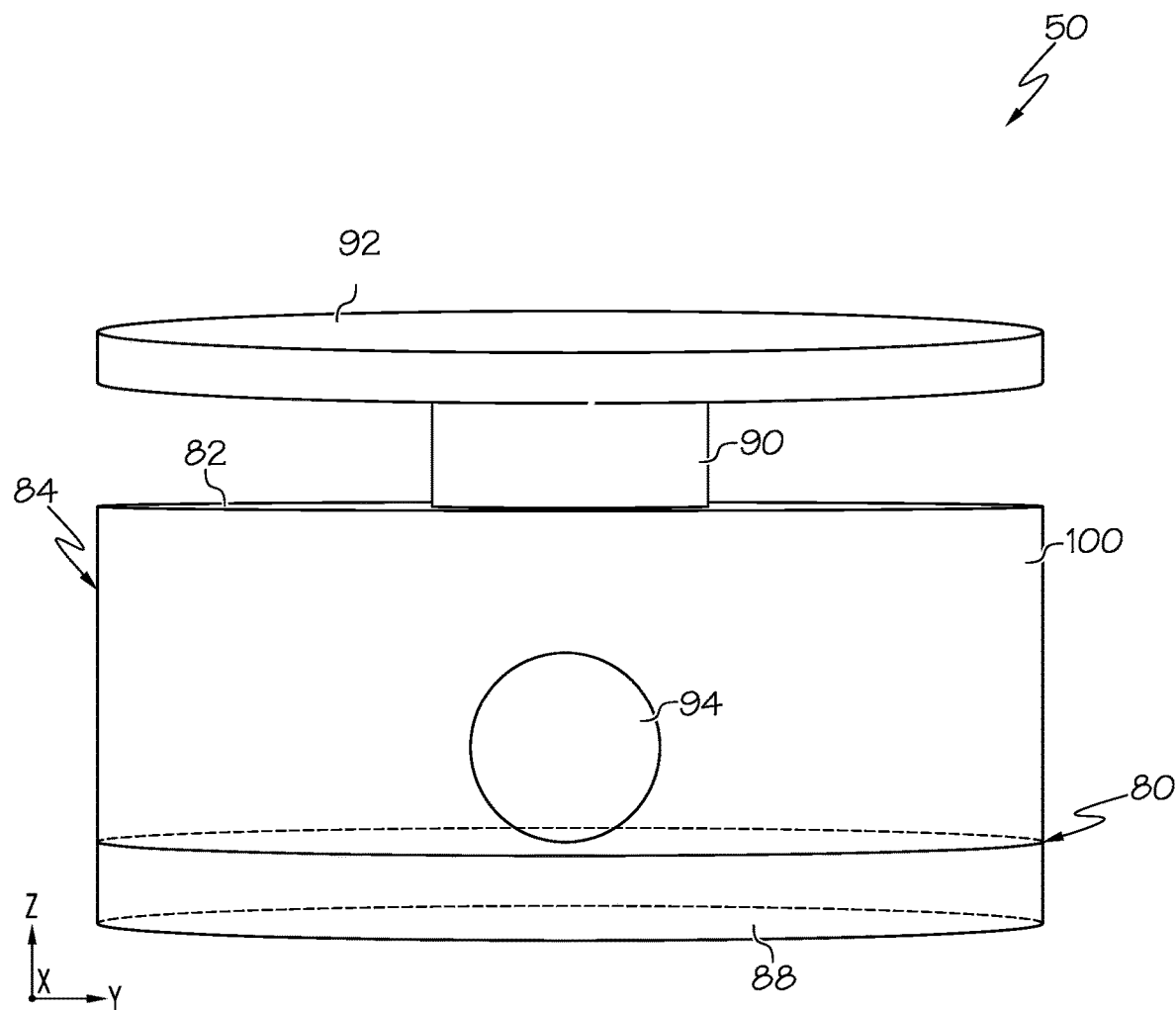
FIG. 3 is a top-side view of a resonator of the heart rate monitoring device of FIG. 1 according to one or more embodiments shown and described herein.

Turning now to FIG. 3, an embodiment of the input component 30 is depicted. As noted herein, the input component 30 may include a sensor 32 that may be configured to detect the heart rate of an occupant of a vehicle. In the embodiment depicted in FIG. 3, the sensor 32 may include a resonator 50, such as a Helmholtz resonator, that may be used to amplify and detect the heart rate of the occupant in the vehicle.

As should be understood, the resonator 50 may be a device configured to amplify and/or enhance particular frequencies of sound and/or vibration. As will be described in additional detail herein, the resonator 50 may amplify and/or enhance certain frequencies by allowing desired frequencies to pass through the resonator 50, while reducing the transmission of other frequencies.

In the context of the present disclosure, the resonator 50 may be designed to amplify and/or enhance the vibrations caused by a pulse of the occupant of the vehicle, which may be used to determine the heart rate of the occupant. The resonator 50 may achieve this by allowing vibrations within a target range frequency corresponding to the heart rate of the occupant of the vehicle to be transmitted more efficiently, while reducing the transmission of other frequencies outside the target range. In these embodiments, the efficient transmission of frequencies in the target range may improve the signal-to-noise ratio of the sound generated by the heart of the vehicle occupant, which may aid in accurately detecting and analyzing the vibrations caused by the heart rate of the occupant. Furthermore, the resonator 50 may also act to reduce interference from other source of noise and/or vibration, such as background noise or vibrations from the vehicle itself.

Figure 4A:
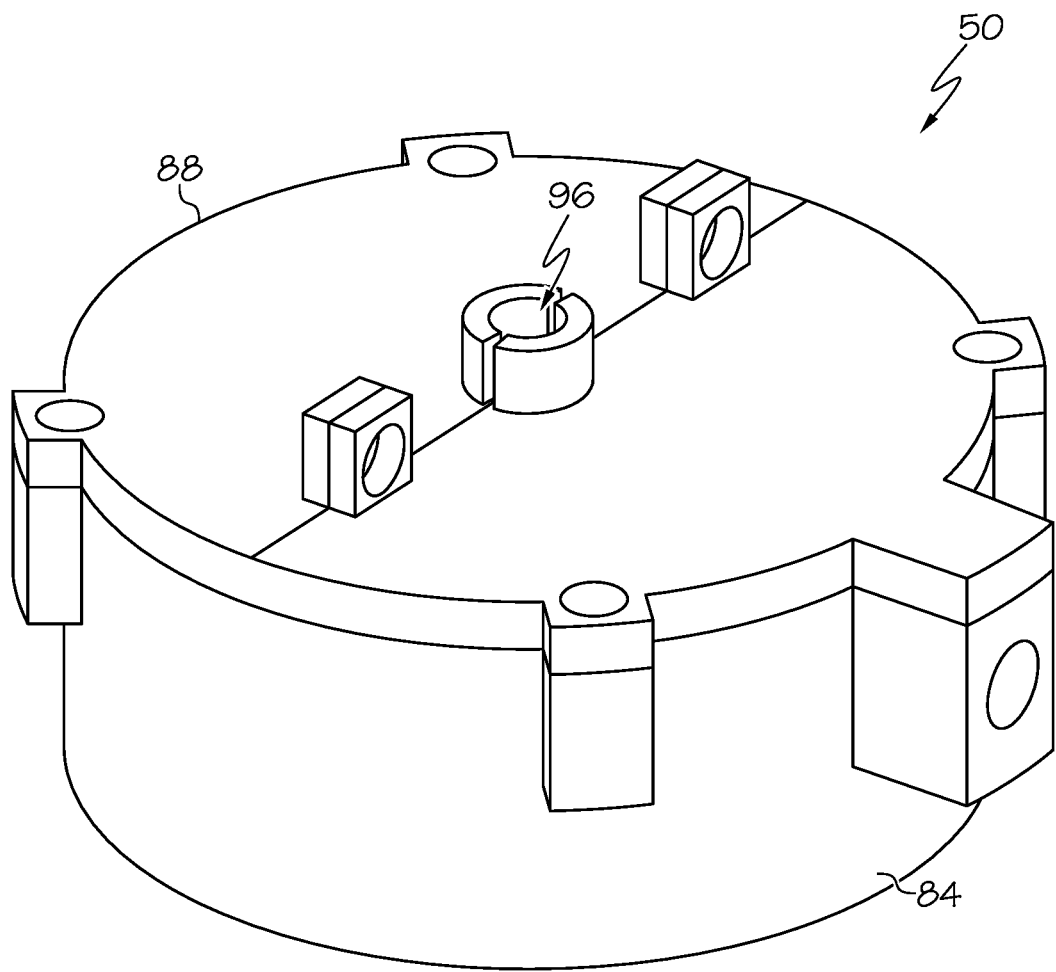
FIG. 4A is a bottom-side perspective view of the resonator of FIG. 3, according to one or more embodiments shown and described herein.
Figure 4B:
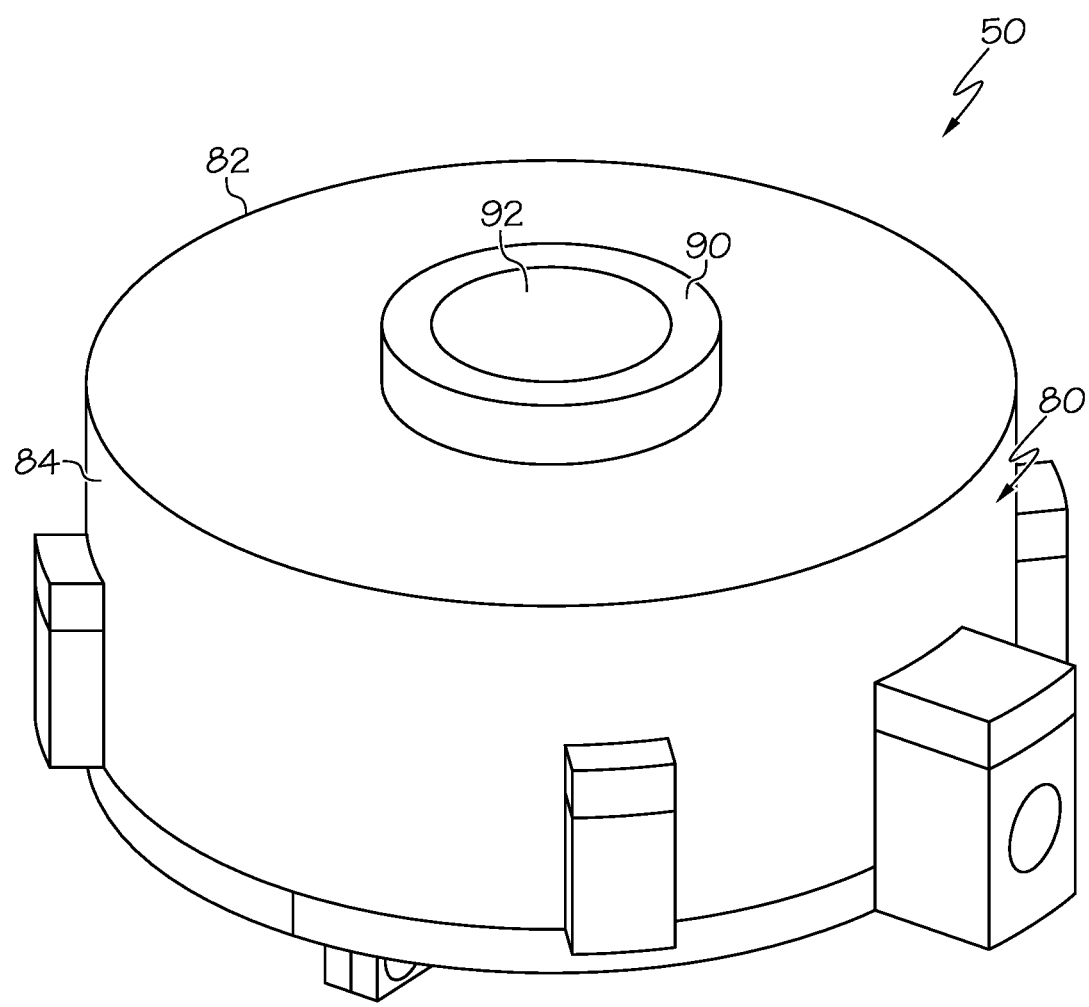
FIG. 4B is a top-side perspective view of the resonator of FIG. 3, according to one or more embodiments shown and described herein.

Referring now to FIGS. 3-4B, an embodiment of the resonator 50 is depicted. In these embodiments, the resonator 50 may include a chamber 80, such as a hollow chamber. The chamber 80 may include a front wall 82 and a sidewall 84 that is extruded from the front wall 82 in a circumferential direction away from the front wall 82, such that the sidewall 84 defines a rear opening 86 opposite the front wall 82. In these embodiments, the chamber 80 may further include a lid 88 that may be disposed over the rear opening 86 to enclose the chamber 80, as is most clearly depicted in FIG. 4A. When the lid 88 is secured over the rear opening 86, the lid 88, front wall 82, and sidewall 84 may define a cavity 100 within the interior of the chamber 80.

As further depicted in FIGS. 3-4B, the resonator 50 may further include a neck 90 that extends from the front wall 82 of the resonator 50 and defines a front opening 92 (FIG. 4B). In these embodiments, the resonator 50 may be positioned within the seat of the vehicle such that the front opening 92 of the neck 90 is adjacent to the seatback 14 of the vehicle (e.g., the portion of the seat which the occupant of the vehicle engages), as is most clearly depicted in FIG. 3. Accordingly, sound and/or vibrations generated by the pulse of the occupant of the vehicle may be translated through the neck 90 of the resonator 50 and into the chamber 80, where particular frequencies of the sound and/or vibration may be amplified.

In these embodiments, a volume of the neck 90 of the resonator 50 may correspond to the range of frequencies that are amplified by the resonator. For example, decreasing the volume of the neck 90 may allow for lower level frequencies (e.g., 20 Hz-70 Hz) to be amplified by the resonator 50, while increasing the volume of the neck 90 may allow for higher level of frequencies to be amplified. Furthermore, although the resonator 50 depicted in FIGS. 3-4B includes a single neck, it should be noted that the resonator 50 may include a plurality of necks, such as two necks, three necks, four necks, or any other desired number of necks, without departing from the scope of the present disclosure.

Referring again to FIG. 3, the cavity 100 of the resonator 50 may filled with a plurality of materials to aid in amplifying sound and/or vibration introduced in the chamber 80. For example, the cavity 100 may be at least partially filled with a first material, such as air, and at least partially filled with a second material. In these embodiments, the second material may be a flexible solid material, such as silicone (e.g., EcoFlex) or any other similar material. In the example embodiment depicted in FIG. 3, the volume of the cavity 100 may be filled with approximately 80% of the second material (e.g., flexible solid material) and approximately 20% of the first material (e.g., air), although it should be understood that the ratio between the first material and the second material may be adjusted depending on the frequencies being measured without departing from the scope of the present disclosure. Furthermore, it should be noted that, by utilizing a plurality of materials within the cavity 100, the size of the resonator 50 may be reduced, such that the resonator 50 can be secured within the seatback of the seat of the vehicle.

In operation, when sound and/or vibration generated by the pulse of the vehicle occupant is introduced into the cavity 100 of the chamber 80, the sound and/or vibration may cause the second material (e.g., the flexible solid material) to vibrate. The vibrations of the second material are transmitted throughout the cavity 100 of the resonator 50, which in turn enhances and/or amplifies particular frequencies depending on the volume of the cavity and the volume of the second material within the cavity 100.

Referring now to FIGS. 3-4B, the amplified and/or enhanced frequencies may be transmitted throughout the cavity 100 of the chamber 80. In these embodiments, the resonator 50 may further include a microphone 94, such as a hydrophone, that may be used to detect and/or record the enhanced and/or amplified frequencies within the cavity 100. As the microphone detects and records the frequencies resonating within the cavity 100, the microphone may convert the vibrational frequencies into an electrical signal, which is then relayed to the processor of the operating system of the heart rate detection device. The processor may then analyze the electrical signal in order to determine the heart rate of the occupant of the vehicle.

As most clearly depicted in FIG. 4A, the lid 88 of the resonator 50 may include a port 96, which may allow the microphone 94 to be fed through the lid 88 of the resonator 50 and into the cavity 100 of the chamber 80. With the microphone 94 secured within the cavity 100, the microphone 94 may be able to detect and record sound and/or vibrations resonating within the cavity 100, as has been described in detail herein.

Figure 5:
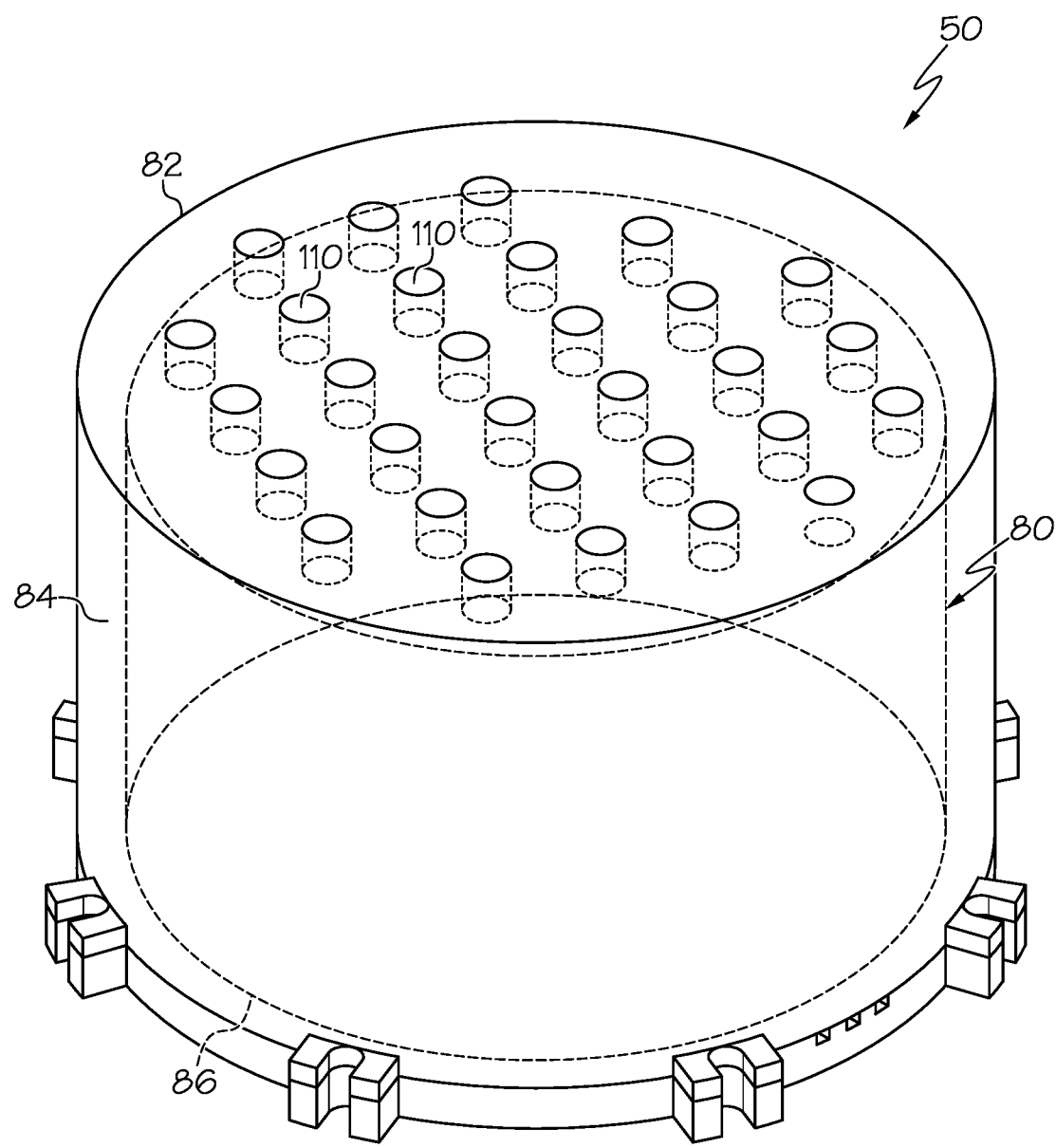
FIG. 5 is a top-side perspective view of an embodiment of a cavity of the resonator of FIG. 3, according to one or more embodiments shown and described herein.

As should be appreciated in view of the foregoing, the structure of the resonator 50 may impact the frequencies of sounds and/or vibrations that are amplified within the cavity 100. Thus, it should be understood that the resonator 50 depicted in FIGS. 3-5 is merely an exemplary resonator 50. For example, the volume of the neck 90, the volume of the cavity 100, the composition and ratio of the first and second materials, and a variety of other structural changes may be made to the resonator 50 in order to alter the frequencies that are amplified by the resonator 50. Accordingly, additional embodiments of a resonator 50 will now be described in detail with reference to FIGS. 5-6.

Referring now to FIG. 5, another embodiment of a resonator 50 is depicted. It should be noted that the resonator of FIG. 5 may be structurally similar to resonator 50 depicted in FIGS. 3-4B; accordingly, the same reference numerals will be used to refer to the same or like parts.

As depicted in FIG. 5, the resonator 50 may include a front wall 82 and a sidewall 84, as has been described herein. However, the resonator 50 of FIG. 5 may not include a neck that extends from the front wall 82. Instead, the front wall 82 of the resonator 50 may include a plurality of perforations 110 that may extend through the front wall 82 of the resonator 50 and into the cavity 100.

In these embodiments, the plurality of perforations 110 in the front wall 82 of the resonator 50 may allow for more efficient transmission of vibrations through the cavity 100, which may in turn help improve the accuracy and reliability of the heart rate data collected by the heart rate detection device. Furthermore, the plurality of perforations 110 may increase the volume of the front opening 92 of the front wall 82, which may aid in allowing vibrations generated by the pulse of the vehicle occupant to be transmitted into the cavity 100 of the resonator. As a result, the plurality of perforations 110 may allow for increased sensitivity within the resonator 50, such that the resonator 50 is capable of detecting smaller and/or more subtle sounds and/or vibrations.

Figure 6:
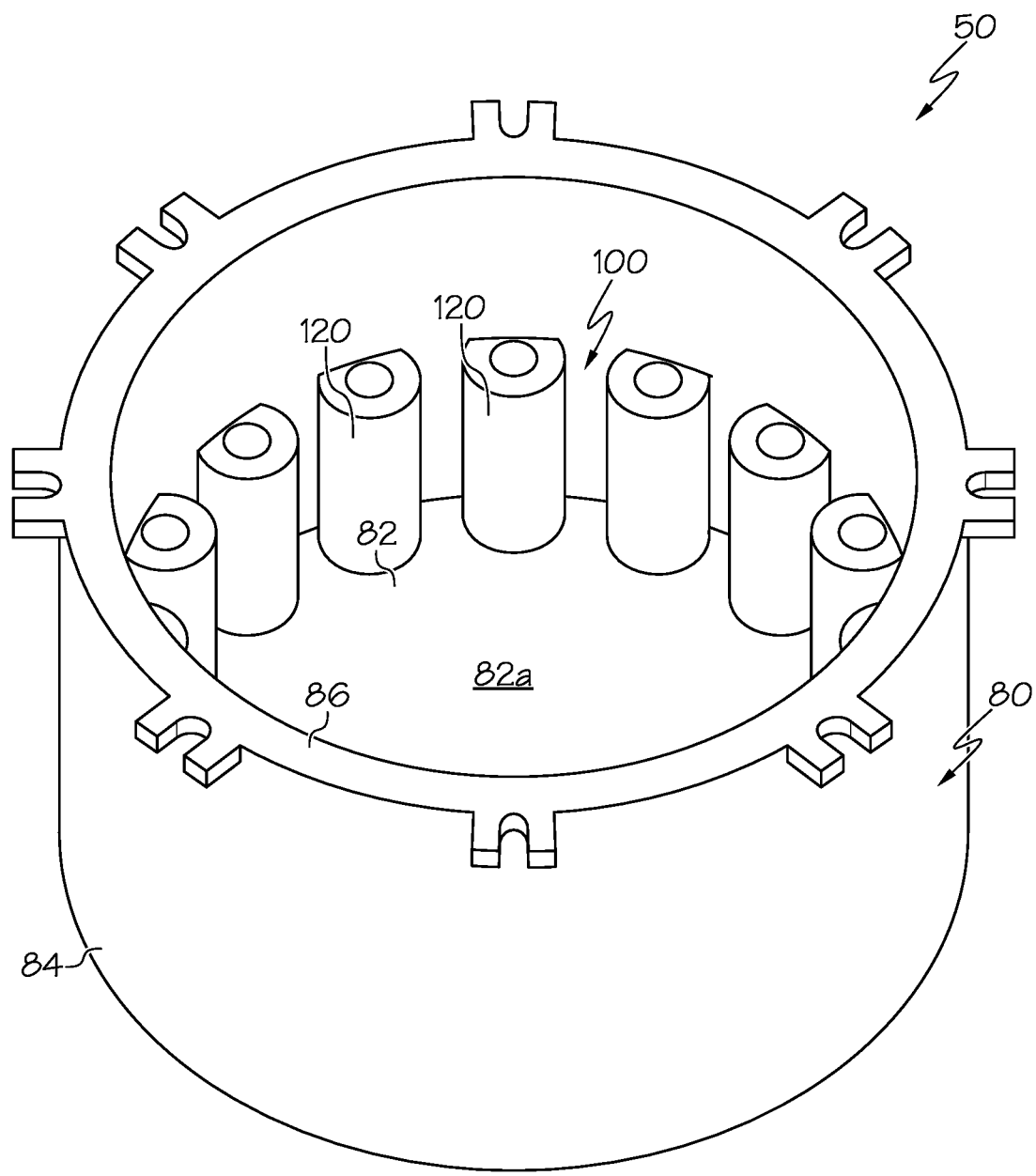
FIG. 6 is a top-side perspective view of another embodiment of a cavity of the resonator of FIG. 3, according to one or more embodiments shown and described herein.

Turning now to FIG. 6, another embodiment of a resonator 50 is depicted. It should be noted that the resonator of FIG. 6 may be structurally similar to resonator 50 depicted in FIGS. 3-5; accordingly, the same reference numerals will be used to refer to the same or like parts.

As depicted in FIG. 6, the resonator 50 may include a chamber 80 having a front wall 82 and a sidewall 84 that is extruded from the front wall 82 in a circumferential direction away from the front wall 82, such that the sidewall 84 defines a rear opening 86 opposite the front wall 82. In these embodiments, the front wall 82 may further include an interior surface 82a, which may be defined as the surface of the front wall that faces inwardly towards the rear opening 86.

In these embodiments, the resonator 50 may further include a plurality of tubes 120, such as hollow tubes, that may be disposed around a perimeter of the interior surface 82a of the front wall 82. In some embodiments, the plurality of tubes 120 may be integrally formed with the interior surface 82a, such that the plurality of tubes 120 extend into the cavity 100 and away from the interior surface 82a of the front wall 82 towards the rear opening 86. In other embodiments, the plurality of tubes 120 may be formed as separate components, which are then fixedly attached (e.g., via welding, bonding, brazing, etc.) to the interior surface 82a of the front wall 82 of the resonator 50.

Referring still to FIG. 6, the plurality of tubes 120 may decrease the volume of the cavity 100, as the plurality of tubes 120 extend into the cavity 100. Accordingly, by decreasing the volume of the cavity 100, the resonator 50 may be more suitable for amplifying lower frequency sounds and/or vibrations. In these embodiments, the plurality of tubes may be filled with either the first material (e.g., air) or the second material (e.g., flexible solid material) depending on the target range of frequencies that are to be amplified by the resonator 50.

Referring collectively now to FIGS. 3-6, it should be understood that the structural configuration of the resonator 50 may impact the frequencies of sound and/or vibration that are amplified and/or enhanced by the resonator 50. In the embodiments described herein, the heart rate detection device 10 may include a target range of frequencies to be amplified and/or enhanced, and the structural configuration of the resonator 50 may be modified as described herein to ensure that the target range of frequencies are achieved.

For example, in some embodiments, resonator 50 may be configured to amplify a particular sound generated by the heart of the occupant of the vehicle. In these embodiments, the heart may be considered to generate a plurality of sounds, including a first sound, a second sound, a third sound, and a fourth sound. The plurality of sounds generated by the heart may relate to cardiac cycles of a vehicle occupant. For example, a typical cardiac cycle may involve a systole phase, when ventricles of the heart contract to pump blood, and a diastole phase, when the ventricles relax and fill with blood.

In these embodiments, the first heart sound may have the highest frequency and the longest duration of any of the plurality of the heart sounds. For example, the first heart sound may have a frequency between 40 Hz and 80 Hz. As a result, the first sound may be the loudest and the steadiest of the plurality of sounds generated by the heart. Accordingly, the first sound generated by the heart may be the easiest to detect and measure, such that it may be desirable to configure the resonator 50 such that sound and/or vibrational frequencies between 40 Hz and 80 Hz are amplified.

It should be further noted that irregularities in the first heart sound may be directly correlated to common medical conditions. For example, irregular rhythms and/or variations in the first heart sound may be indicative of a stenosis or other serious medical condition. As a result, measuring the first heart sound may allow the heart rate detection device 10 to aid in identifying potential medical conditions and notifying an occupant of the vehicle of the medical condition.

Furthermore, the second heart sound may have the second highest frequency and the second longest duration of any of the plurality of heart sounds. For example, the second heart sound may have a frequency between 80 Hz and 150 Hz. Although the second heart sound may be more difficult to identify, irregularities in the second heart sound may also be linked to particular medical conditions, such as hypertension. Accordingly, in some embodiments, it may be desirable to configure the resonator 50 such that the resonator 50 amplifies sounds and/or vibrations having a frequency between 80 Hz and 150 Hz.

Referring collectively still to FIGS. 3-6, it should be noted that the third heart sound and fourth heart sound may not be constantly audible in the heart beat of the occupant of the vehicle. Accordingly, it may be difficult to configure the resonator 50 to specifically detect and amplify the third and/or fourth heart sounds. Furthermore, the third heart sound and fourth heart sound may not be present in some vehicle occupants.

However, in these embodiments, the presence of the third heart sound may indicate impending cardiac arrest in vehicle occupants having preexisting heart conditions. Accordingly, although it may not be desirable to configure the resonator 50 to amplify the third heart sound, the heart rate detection device 10 may still be configured to identify the third heart rate sound in order to aid an occupant of the vehicle experiencing severe cardiac issues.

Similarly, the fourth heart sound may be heard intermittently between splits in the first heart sound. Although the fourth heart sound is rarely generated, the fourth heard rate sound may indicate heart disease even in otherwise healthy individuals. Accordingly, the heart rate detection device 10 may be configured to detect the fourth heart rate sound, such that, when the fourth heart sound is generated, the heart rate detection device 10 can notify the occupant of the vehicle that medical treatment may be required.

Referring now to FIGS. 2-6, and as has been described herein, the heart rate detection device 10 may be configured to constantly monitor heart rate frequencies of a vehicle occupant that fall within a target range frequency. In these embodiments, the resonator 50 may be specifically configured to amplify sounds and/or vibrations that fall within the target range, such that the heart rate and variations in the heart rate of the vehicle occupant may be determined.

As has been described herein, the resonator 50 may be embedded in a seat 12 of the vehicle such that the microphone 94 of the resonator 50 is positioned near the chest of the occupant of the vehicle. In these embodiments, the heart rate detection device 10 may be automatically activated when an occupant of the vehicle engages the seat 12.

In these embodiments, the heart rate detection device 10 may store heart rate data associated with the occupant of the vehicle in the memory 34 of the operating system 20 in order to create a heart rate profile for the occupant of the vehicle. The heart rate detection device 10 may further analyze the heart rate data stored in the memory 34 over multiple operation cycles in order to detect long-term variations and irregularities in the heart rate of the vehicle occupant and/or to determine the comfort level of the occupant of the vehicle.

For example, the heart rate detection device 10 may compile the heart rate data gathered by the resonator 50 to establish a baseline heart rate for a particular vehicle occupant. In these embodiments, the heart rate detection device 10 may measure heart rate data for a predetermined period of time necessary to establish the baseline heart rate, such that a new baseline heart rate may be generated each time a vehicle occupant utilizes the vehicle. In other embodiments, once the baseline heart rate is determined, the occupant of the vehicle may save the baseline heart rate to a user profile, which may be stored within the memory 34. Accordingly, each time the vehicle occupant utilizes the vehicle, the baseline heart rate associated with the particular user profile may be loaded to the heart rate detection device 10, and variations of the heart rate may be determined based on the stored baseline heart rate.

Referring still to FIGS. 2-6, once the baseline heart rate has been established, the resonator 50 may continuously monitor heart rate sounds and vibrations that fall within the target range frequency to generate real-time heart rate data of the occupant of the vehicle. The real-time heart rate data may be compared to the baseline heart rate to determine the health and/or comfort of the occupant of the vehicle.

In these embodiments, the heart rate detection device 10 may be configured to provide feedback to the occupant of the user when irregular and/or variable heart rates are detected. For example, in the event that an irregular heart rate is detected, the heart rate detection device 10 may provide visual and/or aural feedback to the occupant of the vehicle that recommends seeking medical treatment.

In instances where potentially severe health issues are identified, such as cardiac arrest, the heart rate detection device 10 may be further configured to control certain operations of the vehicle. For example, if the heart rate detection device 10 determines that an occupant of the vehicle has entered cardiac arrest, the heart rate detection device 10 may stop the vehicle and notify emergency services of the condition of the occupant. Furthermore, in embodiments in which the vehicle is an autonomous vehicle, the heart rate detection device 10 may automatically adjust the route of the vehicle to take the occupant of the vehicle to a hospital, or other emergency facility, whenever cardiac arrest or other similar heart conditions are detected.

Similarly, the heart rate detection device may also be configured to adjust operation of a vehicle in response to more minimal variations in heart rate data of the occupant. For example, if the heart rate detection device 10 determines that the heart rate of the occupant has increased (relative to the baseline heart rate) in response to the vehicle increasing speed, the heart rate detection device 10 may decrease the speed of the vehicle until the heart rate of the occupant returns to the baseline.

Figure 7:
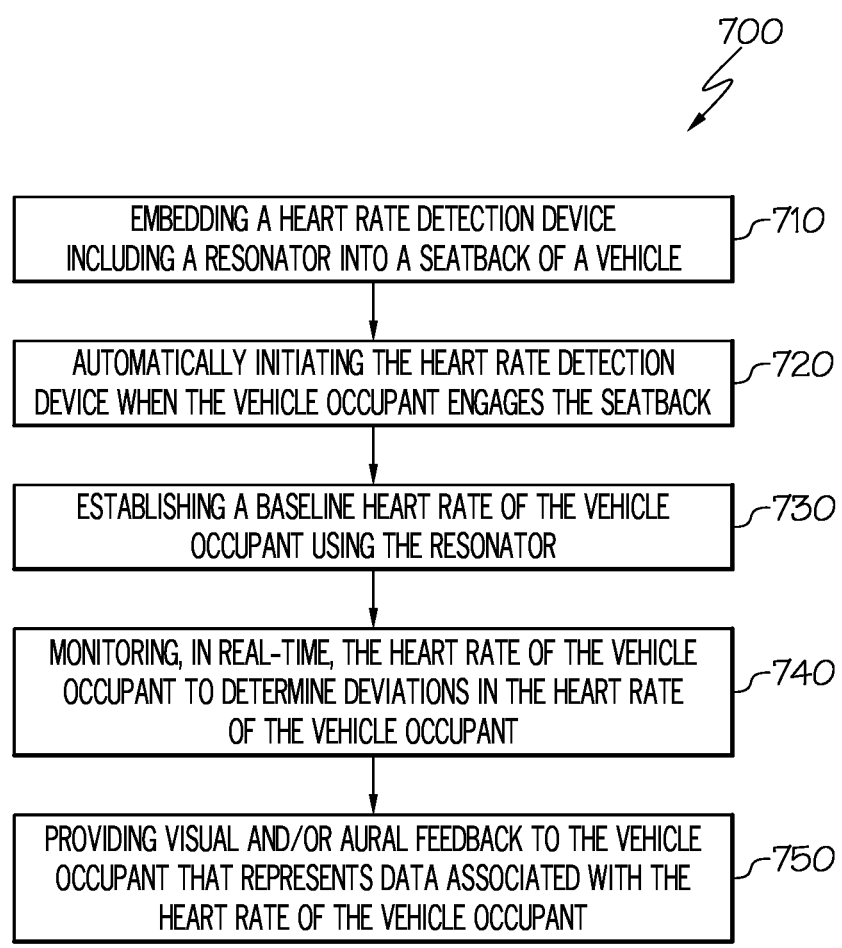
FIG. 7 is an illustrative flow diagram of a method of detecting a heart rate of an occupant of a vehicle, according to one or more embodiments shown and described herein.

Turning now to FIG. 7, an illustrative flow diagram of a method 700 of detecting a heart rate of a vehicle occupant is disclosed. In these embodiments, the method may initially involve embedding a heart rate detection device including a resonator into a seatback of the vehicle. With the input component positioned within the seatback, the method may move to block 710, which may involve automatically activating the heart rate detection device when the occupant of the vehicle engages the seatback. Once the heart rate detection device is activated, the method may move to block 720, which may involve establishing a baseline heart rate of the vehicle occupant using the resonator, as has been described herein.

While the occupant remains engaged with the seatback of the vehicle, the method may further involve measuring, in real-time, a heart rate of the occupant of the vehicle, as depicted at block 730, and monitoring the heart rate of the occupant of the vehicle to determine the occurrence of deviations in the heart rate of the occupant from the baseline. In some embodiments, the method step depicted at block 730 may further involve analyzing the heart rate of the occupant of the vehicle for irregularities that may correspond to particular health conditions.

Referring still to FIG. 7, the method may move to block 740, which may involve providing visual and/or aural feedback to the occupant of the vehicle that represents data associated with the heart rate of the occupant. In these embodiments, the visual and/or aural feedback provided to the occupant of the vehicle may also include warning and/or recommendations to seek medical attention in the event that irregularities are detected in the heart rate of the occupant.

From the above, it is to be appreciated that defined herein are resonators for vehicle heart rate detection devices, vehicle heart rate detection devices, and methods of detecting heart rates of a vehicle occupant. The resonator includes a chamber having a front wall and a sidewall extending circumferentially around the front wall, and the sidewall defines a rear opening opposite the front wall. A lid is secured over the rear opening, and the lid, the front wall, and the sidewall define a cavity within an interior of the chamber. A neck extends from the front wall of the resonator and defines a front opening, and a microphone is positioned within the cavity that records vibrations entering the cavity via the front opening. The cavity is filled at least partially with a first material and at least partially with a second material, and the cavity amplifies the vibrations within a target range frequency.

It should now be understood that embodiments of the present disclosure are directed to vehicle heart rate detection devices that provide a comprehensive and user-friendly tool for monitoring and tracking heart health of an occupant while driving or riding in a vehicle. The disclosed devices may help drivers and passengers stay alert and focused on the road, and can alert them if they are experiencing stress or fatigue that may affect their driving ability. It can also provide valuable data on heart health over time, allowing drivers and passengers to track and manage their heart health more effectively.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A resonator for a vehicle heart rate detection device, the resonator comprising:
   a chamber having a front wall and a sidewall extending circumferentially around the front wall, such that the sidewall defines a rear opening opposite the front wall;
   a lid secured over the rear opening, such that the lid, the front wall, and the sidewall define a cavity within an interior of the chamber;
   a neck that extends from the front wall of the resonator and defines a front opening; and
   a microphone positioned within the cavity that records vibrations entering the cavity via the front opening;
   wherein the cavity is filled at least partially with a first material that is air and at least partially with a second material that is an elastomer such that the cavity amplifies vibrations within a target range frequency.

2. The resonator of claim 1, further comprising a plurality of necks that extend from the front wall of the resonator.

3. The resonator of claim 1, wherein the second material that at least partially fills the cavity of the resonator is silicone.

4. The resonator of claim 1, wherein the microphone is a hydrophone.

5. The resonator of claim 1, wherein the front wall of the chamber includes a plurality of perforations.

6. The resonator of claim 1, further comprising a plurality of tubes disposed about a perimeter of an interior surface of the front wall of the resonator.

7. The resonator of claim 6, wherein the plurality of tubes are filled with at least one of the first material or the second material.

8. The resonator of claim 1, wherein the target range frequency is between 40 Hz and 80 Hz.

9. The resonator of claim 1, wherein the target range frequency is between 80 Hz and 150 Hz.

10. The resonator of claim 1, further comprising a plurality of hollow tubes disposed around an interior surface of the front wall.

11. The resonator of claim 1, wherein a ratio of the first material to the second material is such that the cavity is filled with more of the second material than the first material.

12. A vehicle heart rate detection device comprising:
a vehicle including a seat having a seatback;
a resonator embedded in the seatback, the resonator comprising:
a chamber having a front wall and a sidewall extending circumferentially around the front wall, such that the sidewall defines a rear opening opposite the front wall;
a lid secured over the rear opening, such that the lid, the front wall, and the sidewall define a cavity within an interior of the chamber;
a neck that extends from the front wall of the resonator and defines a front opening; and
a microphone positioned within the cavity that records vibrations entering the cavity via the front opening;
a processor electrically coupled to the resonator, the processor generating a heart rate data of a vehicle occupant based on the vibrations entering the cavity of the resonator;
a display electrically coupled to the processor, the display providing visual feedback related to the heart rate data generated by the processor;
a speaker electrically coupled to the processor, the speaker providing aural feedback related to the heart rate data generated by the processor; and
a memory that stores the heart rate data generated by the processor to create a user profile for the vehicle occupant;
wherein the cavity of the resonator is filled at least partially with a first material that is air and at least partially with a second material that is an elastomer such that the cavity amplifies vibrations within a target range frequency.

13. The vehicle heart rate detection device of claim 12, wherein the second material that at least partially fills the cavity of the resonator is silicone.

14. The vehicle heart rate detection device of claim 12, wherein the processor provides a warning to the vehicle occupant when the heart rate data is indicative of a heart rate that exceeds a predetermined threshold.

15. The vehicle heart rate detection device of claim 12, wherein the processor alters an operation of the vehicle when the heart rate data is indicative of a heart rate that exceeds a predetermined threshold.

16. The vehicle heart rate detection device of claim 12, wherein the front wall of the chamber of the resonator includes a plurality of perforations.

17. The vehicle heart rate detection device of claim 12, wherein the resonator further includes a plurality of tubes disposed about a perimeter of an interior surface of the front wall of the resonator.

18. The vehicle heart rate detection device of claim 12, wherein the target range frequency is between 40 Hz and 80 Hz.

19. The vehicle heart rate detection device of claim 12, wherein the target range frequency is between 80 Hz and 150 Hz.

20. The vehicle heart rate detection device of claim 12, further comprising a plurality of hollow tubes disposed around an interior surface of the front wall.

* * * * *